US006548966B2

United States Patent
Kawasaka et al.

(10) Patent No.: US 6,548,966 B2
(45) Date of Patent: Apr. 15, 2003

(54) DISCHARGE LAMP LIGHTING DEVICE

(75) Inventors: Taihei Kawasaka, Tokyo (JP); Hidehiko Kinoshita, Tokyo (JP); Akihiko Iwata, Tokyo (JP); Takahiro Urakabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/013,466

(22) Filed: Dec. 13, 2001

(65) Prior Publication Data

US 2002/0175636 A1 Nov. 28, 2002

(30) Foreign Application Priority Data

May 25, 2001 (JP) ......................................... 2001-157545

(51) Int. Cl.$^7$ .............................. G05F 1/00; H05B 37/02
(52) U.S. Cl. .................................... 315/291; 315/209 R
(58) Field of Search ................................. 315/291, 302, 315/307, 313, 315, 209 R, 212, 213, 214, 247, DIG. 7; G05F 1/00; H05B 37/02

(56) References Cited

U.S. PATENT DOCUMENTS 5,914,572 A * 6/1999 Qian et al. .................. 315/307
5,926,381 A * 7/1999 Moriguchi et al. ............ 363/17
6,008,594 A * 12/1999 Kita et al. ................... 315/307
6,166,932 A * 12/2000 Otoshi ....................... 363/56.03
6,232,728 B1 * 5/2001 Yamamoto et al. .......... 327/539
6,392,364 B1 * 5/2002 Yamamoto et al. ......... 315/291
6,437,515 B1 * 8/2002 Kamoi et al. ........... 315/209 R
6,476,568 B2 * 11/2002 Urakabe et al. ............. 315/307
2002/0047639 A1 * 4/2002 Okuchi et al. .............. 315/307

FOREIGN PATENT DOCUMENTS

| JP | 8-273871 | 10/1996 | ........... H05B/41/36 |
| JP | 2875129 B2 | 1/1999 | ........... H05B/41/29 |
| JP | 11-329777 | 11/1999 | ........... H05B/41/25 |

* cited by examiner

Primary Examiner—Don Wong
Assistant Examiner—Trinh Vo Dinh
(74) Attorney, Agent, or Firm—Sughrue Mion, PLLC

(57) ABSTRACT

A discharge lamp lighting device comprises a booster circuit 2 for boosting the voltage of a DC power source 1 in response to the ON-OFF operation of a switching element 2c, a startup discharge circuit 9 for performing the startup discharge of a discharge lamp 10 according to the boosted DC voltage, a voltage detection circuit 5 for detecting the boosted DC voltage, a control circuit 7b for outputting the pulse modulated by pulse width modulation to the switching element 2c, and a control circuit 7a for controlling the pulse output from the control circuit 7b to the switching element 2c to intermittently enabling or disabling the passage thereof.

3 Claims, 12 Drawing Sheets

SWITCHING ELEMENT GATE INPUT PULSE
WAVEFORM FOR FIRST EMBODIMENT

SWITCHING ELEMENT GATE INPUT PULSE
WAVEFORM FOR PRIOR ART EXAMPLE

I1: CURRENT FLOWING THROUGH DISCHARGE LAMP 10

I2: CURRENT SUPPLIED FROM CAPACITOR 2e TO DISCHARGE LAMP 10

I3: CURRENT FLOWING FROM SECONDARY WINDING 2b TO DIODE 2d

DISCHARGE LAMP LIGHTING DEVICE

BACKGROUND OF THE INVENTION

1. Field of the Invention

This invention is related to a discharge lamp lighting device which is used as the light source for an automobile headlight.

2. Description of Related Art

FIG. 13 is a circuit diagram showing a conventional discharge lamp lighting device, and in the figure, 1 is a DC power source such as a battery, 2 is a booster circuit for boosting the voltage of the DC power source 1, and in the booster circuit 2, 2a is a primary winding of a transformer connected to the DC power source 1, 2b is a secondary winding for outputting the boosted voltage, 2c is a switching element connected to the DC power source 1 and the primary winding 2a, 2b is a diode connected to the secondary winding 2b, and 2e is a capacitor. Further, 3 is an earth line, and 4 is a current detection resistor for detecting the output current of the booster circuit 2.

5 is a voltage detection circuit for detecting the voltage Va boosted to the minus side by the booster circuit 2, and in the voltage detection circuit 5, VDD is a 5 V power source, and 5a and 5b are resistors. 6 is an inverter circuit, in which 6a–6d are switching elements. 7 is a control unit for controlling the switching element 2c and a driver 8 which is used for driving the inverter circuit 6. 9 is a startup discharge circuit, in which 9a is a transformer, 9b is a discharge tube switch, and 9c is a capacitor. Further, 10 is a discharge lamp, in which 10a and 10b are electrodes.

FIG. 14 is a circuit diagram showing the details of the conventional control unit, and the control unit 7 in FIG. 13 includes control circuits 7a, 7b, and 7c, an interface 7d (hereinafter abbreviated as I/F 7d), and a microcomputer 7e in FIG. 14. Further, lines A to E in FIG. 13 are connected to A to E in FIG. 14.

In the figure, the control circuit 7a includes an operational amplifier B1, the power source VDD, resistors R1 to R3, and a diode D2, the control circuit 7b includes a comparator A2, the power source VDD, a power source VCC (8 V power source), resistors r3 to r7, and capacitors C1 and C2, and the control circuit 7c includes a diode D1, an operational amplifier A3, a resistor r8, and a capacitor C3.

Now, the operation of the discharge lamp lighting device as configured above will now be described below.

In FIG. 13, when the voltage of the DC power source 1 is input to the booster circuit 2 and simultaneously the control unit 7 starts to operate, the control unit 7 outputs a pulse signal having a certain frequency and a certain duty ratio value to the gate of the switching element 2c, thereby to turn on and off the switching element 2c. Further, the control unit 7 also sends a signal to the driver circuit 8. Whereupon, the driver circuit 8 sends a signal to the gates of the switching elements 6a and 6d to turn on and off the switching elements 6a and 6d. The duty ratio of the pulse signal sent to the gate of the switching element 2c can be varied by the control of the control unit 7.

During the period over which the switching element 2c is ON, the current from the DC power source 1 is supplied to the primary winding 2a and electromagnetic energy is accumulated in the primary winding 2a. Whereupon, an induced counter-electromotive force occurs in the secondary winding 2b, but a reverse bias is applied to the diode 2d, and no current flows in the secondary side of the booster circuit 2. During the period over which the switching element 2c is OFF, an induced counter-electromotive force occurs in the secondary winding 2b, a forward bias is applied to the diode 2d, and a loop is formed by the secondary winding 2b, diode 2d, and the capacitor 2e, so that the electromagnetic energy accumulated in the primary winding 2a during the ON period is accumulated in the capacitor 2e as electrostatic energy through the diode 2d. A voltage Va corresponding to that occurs in the secondary side of the booster circuit 2. ON-OFF of the switching element 2c is repeated by the pulse waveform from the control unit 7, and the voltage Va is gradually boosted to the minus side.

The voltage Va is input to the voltage detection circuit 5, and it is divided by the resistors 5a to 5d and input to the control unit 7. The control unit 7 continues to output to the gate of the switching element 2c a pulse signal of a fixed cycle, which has a predetermined value, for instance, a certain duty ratio value, and which is held when the voltage Va reaches −480 V. To hold −480 V of the voltage Va until the discharge lamp 10 starts to light, the duty ratio is controlled to be a small value of the order of 10 to 50% in the control circuit 7a in FIG. 14. At this point, the output voltage of the operational amplifier B1 lowers, and the diode D2 is electrically conducted and draws out the electric charge of the capacitor C1 to drop the duty ratio to about 10 to 50%. Further, the diode D1 is not conductive immediately before and after the startup of lighting. In addition, since the switching elements 6a and 6d are ON, substantially the voltage Va is applied between both electrodes of the discharge lamp 10.

After the elapse of some time since the voltage Va has reached −480 V, when the voltage difference between both electrodes of the discharge tube switch 9b of the startup discharge circuit 9, or the voltage difference of the capacitor 9c reaches, for instance, about 400 V, the discharge tube switch 9b is turned ON and a current flows through the primary winding of the transformer 9a to generate a high-voltage pulse of about 20 kV in the secondary winding, and the high-voltage pulse is applied to the discharge lamp 10 to cause breakdown between both electrodes of the discharge lamp 10, and a current flows through the discharge lamp 10, which starts to light.

Whereupon, the voltage Va of the electrode 10b of the discharge lamp 10 rapidly rises from −480 V, and the voltage of the electrode 10a becomes a value obtained by multiplying the current flowing through the discharge lamp 10 by the value of the current detection resistor 4. The rapid increase in the voltage Va is detected by the voltage detection circuit 5, and the divided value of the voltage Va is sent to the control unit 7. At this point, the control unit 7 detects the success of the startup discharge of the discharge lamp 10, and continues to turn ON the switching elements 6a and 6d until about several tens msec after the discharge lamp 10 starts to light. With the rapid increase in the value of the voltage Va just after the breakdown of the discharge lamp 10, the electrostatic energy accumulated in the capacitor 2e is supplied as a current to the discharge lamp 10 for about several tens to several hundreds μsec (discharge growth period). Thereafter, by the ON-OFF operation of the switching element 2c, electrostatic energy is again supplied to capacitor 2e, and a current is also supplied to the discharge lamp 10. Right after the breakdown, the output of the operational amplifier B1 also increases as the voltage Va increases, the diode D2 is not conducted, and the capacitor C1 starts recharged, and thereafter the duty ratio is determined under the control of the control circuit 7c.

The switching elements 6a and 6d are in the ON state for about several tens msec after the lighting startup of the discharge lamp 10, applying a DC voltage to the discharge lamp 10 to stabilize the discharge, and thereafter a signal is sent from the control unit 7 to an input terminal of the driver circuit 8, and a signal is then output from the driver circuit 8 for turning ON the switching elements 6b and 6c, thereby causing a current of the reverse direction to flow through the discharge lamp 10 for about several tens msec. Thereafter, a signal is output from the driver circuit 8 for alternately turning ON and OFF the switching elements 6a and 6d and the switching elements 6b and 6c to light the discharge lamp 10 in an AC condition, allowing transition of the discharge lamp 10 to a stable steady period.

In the DC lighting period for several tens msec after the lighting startup and the subsequent AC lighting period as described above, the value of the current supplied to the discharge lamp 10 is determined based on the signal from the current detection resistor 4 and the voltage detection circuit 5, and the duty ratio for turning ON and OFF the switching element 2c is controlled by the control circuit 7c to continuously light the discharge lamp 10, so that the voltage Va between both electrodes of the discharge lamp 10 and the current pattern, as shown in FIG. 15, are provided as predetermined. FIG. 15 is the voltage vs. current pattern that satisfies, for instance, maximum current of 2.6 A, maximum power of 75 W, and power of 34 W during the stable steady period. The voltage Vb is the voltage between the electrodes of the discharge lamp 10 in the stable steady period.

FIG. 16 shows a diagrammatic illustration of the current I1 flowing through the discharge lamp 10 during the discharge growth period immediately after the breakdown, the current I2 supplied from the capacitor 2e to the discharge lamp 10, and the current I3 flowing from the secondary winding 2b to the diode 2d, for the case that the discharge lamp 10 is powered off after lighted for a sufficiently long time and soon lighted again. The current I3 is supplied to the capacitor 2e and the discharge lamp 10, but, if the rise of the current I3 is delayed, the current flowing through the discharge lamp 10 becomes less at about the end of the discharge growth period, that is, at the end of the supply of a current from the capacitor 2e to discharge lamp 10 is terminated. For this reason, as shown in FIG. 17A, the discharge lamp 10 easily causes lighting failure at this point of time. If the discharge lamp 10 is lighted after shut off for a sufficiently long time, the current flowing through the discharge lamp 10 is more than the above case, so that lighting failure is difficult to be caused at about the end of the discharge growth period.

To increase the current flowing through the discharge lamp 10, what should be done is only to increase the current I3 during the discharge growth period. However, it is difficult for the control circuit 7 to increase the current I3 by increasing the duty ratio from a smaller value of about 10–50% just before the lighting startup to a larger value, for instance, of about 70–90% in the very short discharge growth period. The reason for this is because the response time of control for changing the duty ratio in the control circuit 7 based on the signal input from the voltage detection circuit 5 is shorter later than the discharge growth period. The voltage input from the voltage detection circuit 5 to a control circuit 7a is input through the operational amplifier B1 and a CR circuit formed of resistors r3 and r4 and a capacitor C1 to a comparator A2, which determines the duty ratio. By the voltage input to the comparator A2, a rectangular waveform having a certain duty ratio is formed, and sent to the gate of the switching element 2c. The capacitor C1 functions to protect the comparator A2 from surge. The time constant of the combination of the operational amplifier B1 and the CR circuit is larger than the discharge growth period, and thus, such control to make the duty ratio a larger value of 70–90% within the very short discharge growth period of about several tens to several hundreds $\mu$sec is not possible.

As an example of a conventional discharge lamp lighting device based on the control system as described above, for instance, there is the one described in Japanese Patent Publication No. 2875129.

Since the conventional discharge lamp lighting device is constructed as above, it is difficult to determine the optimum duty ratio of the rectangular waveform sent to the switching element 2c for variations in the output voltage and current of the booster circuit 2, within the very short time of the discharge growth period of several tens to several hundreds $\mu$sec just after the breakdown of the discharge lamp 10, and there is a problem that the secondary side output current of the booster circuit 2 cannot be promptly increased just after the breakdown of the discharge lamp 10, and that after the electrostatic energy accumulated in the capacitor 2e is supplied to the discharge lamp 10 as a current, a period appears during which the current supplied to the discharge lamp 10 rapidly decreases, and at that instant, lighting failure easily occurs in the discharge lamp 10.

This invention was accomplished to solve the above problem, and its object is to obtain a discharge lamp lighting device in which the output current of the booster circuit is increased during the discharge growth period after the breakdown of the discharge lamp to eliminate the lighting failure of the discharge lamp.

SUMMARY OF THE INVENTION

The discharge lamp lighting device according to this invention comprises a first control circuit for outputting a pulse modulated by pulse width modulation to the switching element of a booster circuit, and a second control circuit for controlling the pulse output from the first control circuit to the switching element in such a manner as to intermittently enable or disable the passage thereof, in order that the DC voltage detected by the voltage detection circuit becomes a predetermined voltage.

In accordance with this invention, the first control circuit may be constructed to carry out a pulse width modulation so as to hold the duty ratio of the pulse output immediately before and after the lighting startup of the discharge lamp to a larger value.

The discharge lamp lighting device related to this invention may further comprise a third control circuit, which determines the lighting startup of the discharge lamp according to the DC voltage detected by the voltage detection circuit, and controls the pulse width modulation by the first control circuit to vary the duty ratio of the output pulse from the larger value to a smaller value during the period of about several tens to several hundreds $\mu$sec after the lighting startup of the discharge lamp.

DETAILED DESCRIPTION OF THE PREFERRED EMBODIMENTS

Now, some embodiments of this invention are now described below.

(First Embodiment)

Figure 1:
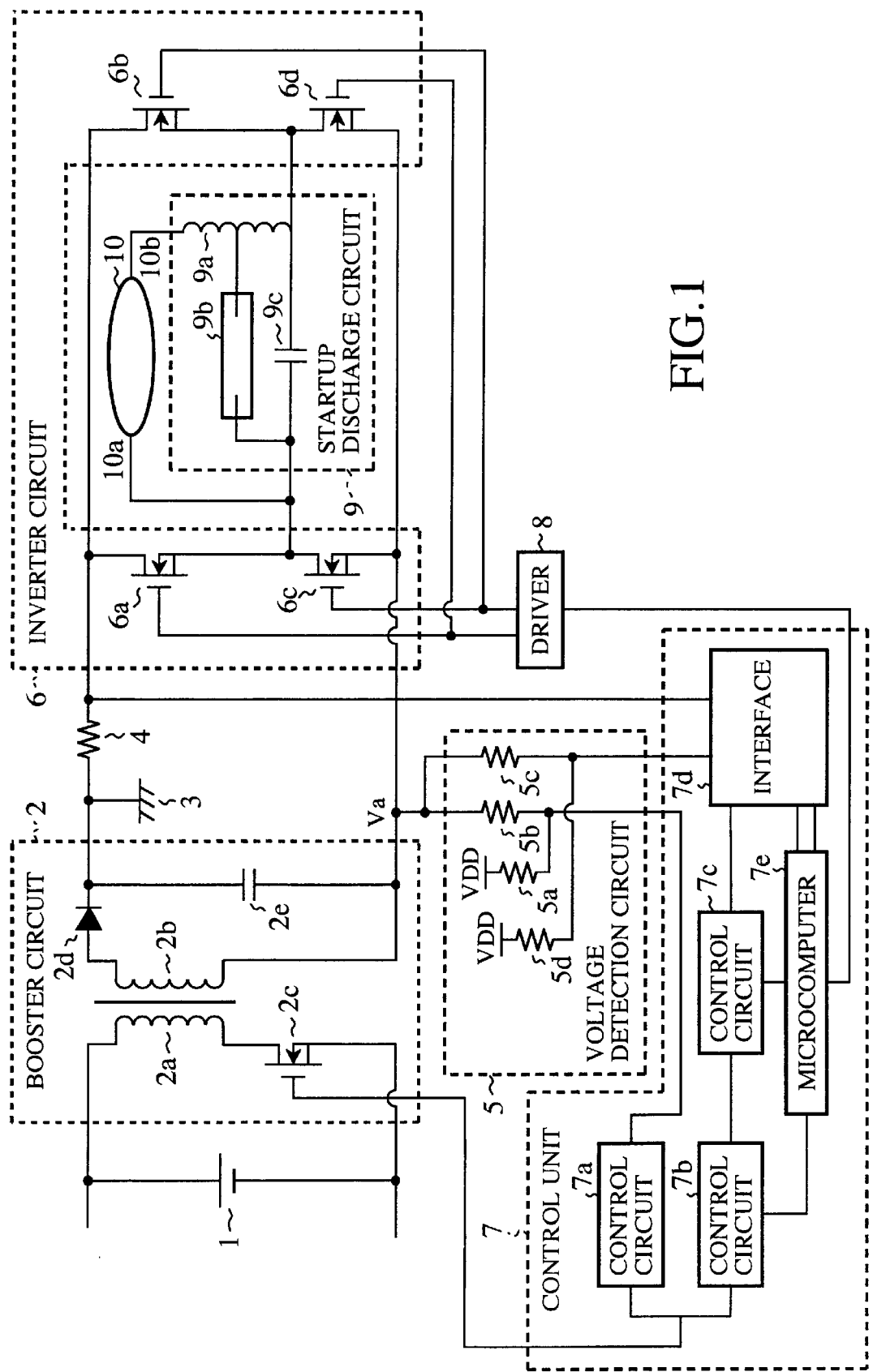
FIG. 1 is a circuit diagram showing the discharge lamp lighting device according to a first embodiment of this invention.

FIG. 1 is a circuit diagram showing the discharge lamp lighting device according to a first embodiment of this invention, and in the figure, 1 is a DC power source such as a battery, and 2 is a booster circuit for boosting the voltage of the DC power source 1, and in the booster circuit 2, 2a is a primary winding of a transformer connected to the DC power source 1, 2b is a secondary winding for outputting the boosted voltage, 2c is a switching element connected to the DC power source 1 and the primary winding 2a, 2d is a diode, and 2e is a capacitor. One terminal of the primary winding 2a is connected to the plus electrode of the DC power source 1, and the other terminal is connected to the drain terminal of the switching element 2c. The source terminal of the switching element 2c is connected to the minus electrode of the DC power source 1. The gate terminal of the switching element 2c is connected to the first output terminal of a control unit 7.

Further, numeral 3 is an earth line, and 4 is a current detection resistor for detecting the output current of the booster circuit 2. The anode terminal of the diode 2d is connected to one terminal of the secondary winding 2b, and the cathode terminal of the diode 2d is connected to one terminal of capacitor 2e, and also connected to the earth line 3 and to one terminal of the current detection resistor 4.

Reference numeral 5 is a voltage detection circuit for detecting the voltage Va boosted to the minus side by the booster circuit 2, and in the voltage detection circuit 5, 5a to 5d are resistors, and VDD is a 5 V power source. One terminal of the resistor 5a is connected to the power source VDD, and the other terminal is connected to one terminal of the resistor 5b and to the first input terminal of the control unit 7. One terminal of the resistor 5d is connected to the power source VDD, and the other terminal is connected to one terminal of the resistor 5c and to the second input terminal of the control unit 7.

Reference numeral 6 is an inverter circuit consisting of switching elements 6a to 6d. The other terminal of the current detection resistor 4 is connected to the third input terminal of the control unit 7 and to the drain terminals of the switching elements 6a and 6b. The source terminals of the switching elements 6a and 6b are connected to the drain terminals of the switching elements 6c and 6d, respectively. The other terminals of the resistors 5b and 5c of the detection circuit 5 are connected to the other terminal of the secondary winding 2b, the other terminal of the capacitor 2e, and to the source terminals of the switching elements 6c and 6d. Numeral 8 is a driver for driving the inverter circuit 6, and the input terminal of the driver 8 is connected to the second output terminal of the control unit 7. The first output terminal of the driver 8 is connected to the gates of the switching elements 6a and 6d, and the second terminal of the driver 8 is connected to the gates of the switching elements 6b and 6c.

Numeral 9 is a startup discharge circuit, consisting of a transformer 9a, a discharge tube switch 9b, and a capacitor 9c. One terminal of the primary winding of the transformer 9a is connected to one terminal of the discharge tube switch 9b, and the other terminal is connected to one terminal of the capacitor 9c and to the source terminal of the switching element 6b. One terminal of the secondary winding of the transformer 9a is connected to one terminal of the discharge switch 9b, and the other terminal is connected to the electrode 10b of a discharge lamp 10. The electrode 10a of the discharge lamp 10 is connected to the source terminal of the switching element 6a, and also to the other terminal of the discharge tube switch 9b and the other terminal of the capacitor 9c.

Figure 2:
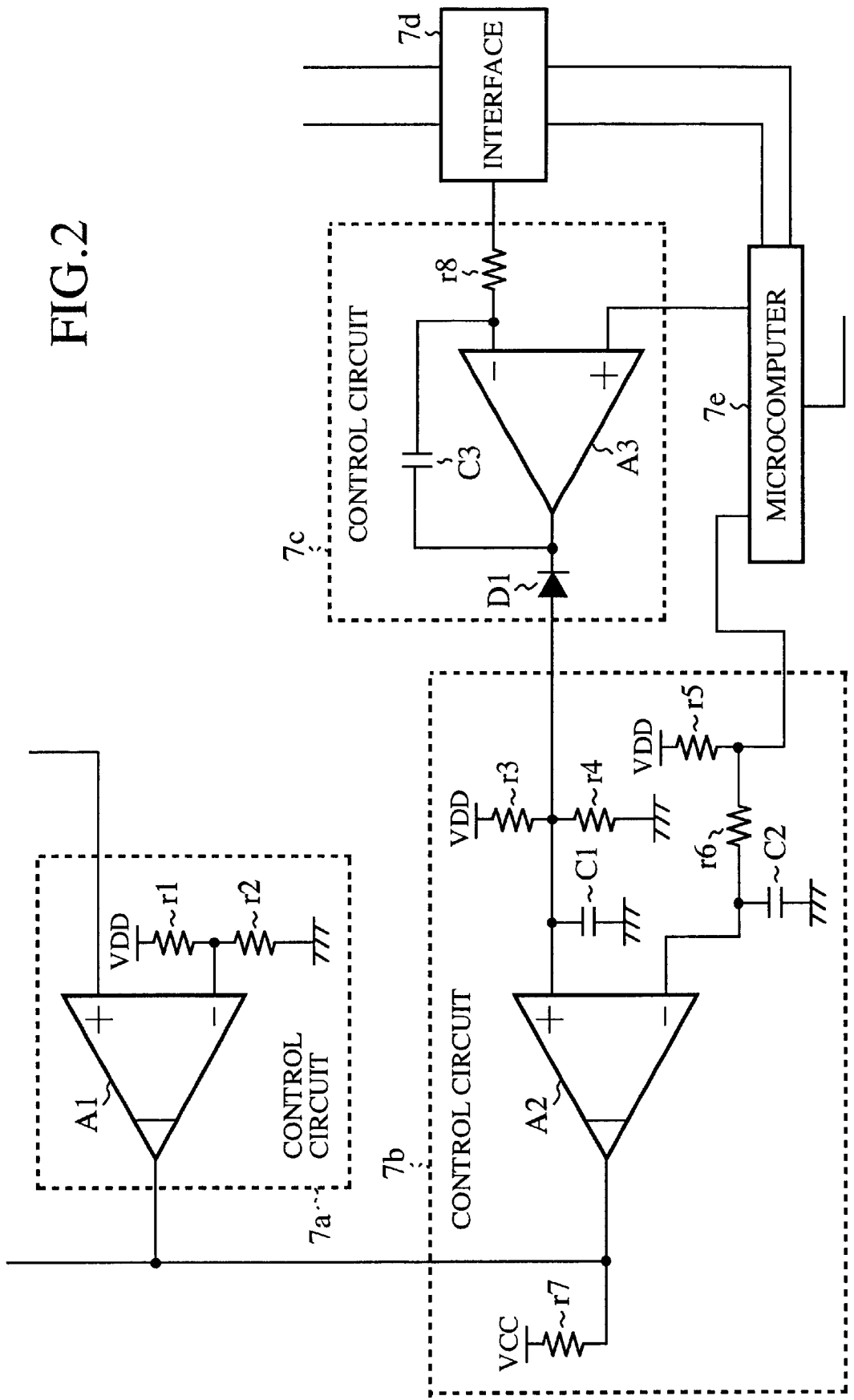
FIG. 2 is a circuit diagram showing the details of the control circuit according to the first embodiment of this invention.

FIG. 2 is a circuit diagram showing the details of the control circuit according to the first embodiment of this invention, and in the figure, the control unit 7 comprises control circuits 7a to 7c, an interface 7d (hereinafter abbreviated as I/F 7d), and a microcomputer 7e. The control circuit (second control circuit) 7a consists of a comparator A1, a power source VDD, and resistors r1 and r2; the control circuit (first control circuit) 7b consists of a comparator A2, a power source VDD, a power source VCC (8 V power source), resistors r3 to r7, and capacitors C1 and C2; and the control circuit 7c consists of a diode D1, an operational amplifier A3, a resistor r8, and a capacitor C3.

In the control circuit 7a, the output terminal (output terminal of the comparator A1) is connected to the output terminal of the control circuit 7b (output terminal of the comparator A2), to the gate terminal of the switching element 2c and to one terminal of the resistor r7. The other terminal of the resistor r7 is connected to the power source VCC. The plus input terminal of the comparator A1 is connected to the other terminal of the resistor 5a and one terminal of the resistor 5b. One terminal of the resistor r2 is connected to GND, and the other terminal is connected to one terminal of the resistor r1 and also to the minus input terminal of the comparator A1. The other terminal of the resistor r1 is connected to the power source VDD.

In the control circuit 7b, one terminal of the resistor r3 is connected to the power source VDD, and the other terminal is connected to one terminal of the resistor r4, and also to the plus input terminal of the comparator A2, one terminal of the capacitor C1, and to the output terminal of the control circuit 7c. The other terminal of the resistor r4 is connected to GND. The other terminal of the capacitor C1 is connected to GND. The minus input terminal of the comparator A2 is connected to one terminal of the capacitor C2 and of the resistor r6. The other terminal of the capacitor C2 is connected to GND. The other terminal of the resistor r6 is connected to one terminal of the resistor r5. The other terminal of the resistor r5 is connected to the power source VDD.

In the control circuit 7c, the output terminal of the operational amplifier A3 is connected to the cathode terminal of the diode D1 and to one terminal of the capacitor C3. The other terminal of the capacitor C3 is connected to the minus input terminal of the operational amplifier A3 and to the other terminal of the resistor r8. The output terminal of the control circuit 7c is connected to the anode terminal of the diode D1.

The first input terminal of the I/F 7d is connected to the other terminal of the resistor r5 and one terminal of the resistor 5c. One terminal of the resistor 5d is connected to the power source VDD. The second input terminal of the I/F 7d is connected to the other terminal of the current detection resistor 4. The first to third output terminals of the I/F 7d are connected to the first and second input terminals of the microcomputer 7e and one terminal of the resistor r8, respectively. The first output terminal of the microcomputer 7e is connected to the other terminal of the resistor r5 of the control circuit 7b, and the second output terminal is connected to the input terminal of the driver 8. The third output terminal is connected to the plus input terminal of the operational amplifier A3.

The operation of the discharge lamp lighting device as configured above will now be described below.

Figure 3A:
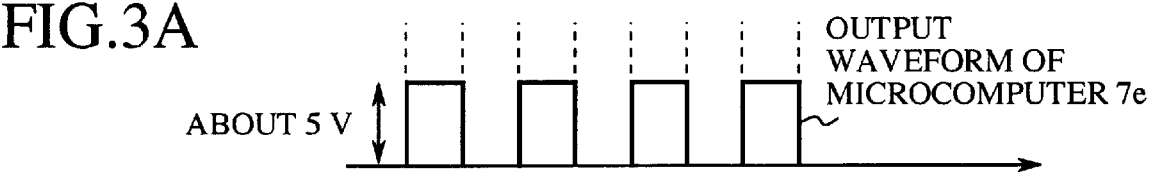
FIGS. 3A to 3C are pulse waveforms, which are input and output at the comparator in the control circuit of the discharge lamp lighting device.
Figure 3B:
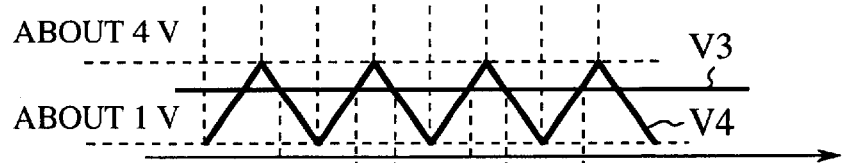

First, description is made to the formation process of the rectangular wave of the pulse signal sent to the gate of the switching element 2c. In FIG. 2, the control circuit 7b is a control circuit which performs a PWM control enabling the change of the duty ratio of the pulse signal for turning on and off the switching element 2c, as in the conventional discharge lamp lighting device. From the microcomputer 7e to the other terminal of the resistor r6, a rectangular wave having a certain frequency as shown in FIG. 3A is sent, and by a CR circuit, a waveform converted to a substantially triangular wave as shown in FIG. 3B is sent to the minus input terminal of the comparator A2.

Figure 3C:
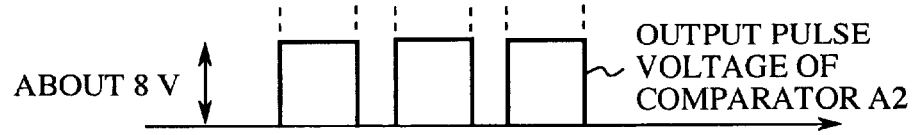

Described first is the formation process of the rectangular wave of the pulse signal sent to the switching element 2c when there is no comparator A1 provided (for the case of the conventional lighting device). In FIG. 3B, if the voltages which are input to the plus input terminal and the minus input terminal of the comparator A2 are V3 and V4, respectively, then control is made such that the output terminal of the control circuit 7b (the output terminal of the comparator A2) is connected to the GND (not shown in FIG. 2) of the comparator A2 when V3 is smaller than V4, while the output terminal is disconnected from the GND of the comparator A2 when V3 is larger than V4. Thus, as shown in FIG. 3C, if disconnected from the GND, the voltage of the pulse signal sent to the gate of the switching element 2c is about 8 V of the VCC power source, and if connected to the GND, the voltage of the pulse signal sent to the gate of the switching element 2c is 0 V, whereby a rectangular wave of a fixed frequency is formed. The duty ratio decreases as the value of V3 decreases, and increases as the value of V3 increases.

In the case where the comparator A1 exists as in this first embodiment, a certain signal from the voltage detection circuit 5 is input to the plus input terminal of the comparator A1. That is, a value V1 obtained by dividing the output voltage Va of the booster circuit 2 by the resistors 5a and 5b is input. Further, to the minus input terminal of the comparator A1, a voltage V2 determined by the resistors r1 and r2, which is always constant, is input. Control is made such that the output terminal of the control circuit 7a (the output terminal of the comparator A1) is connected to the GND (not shown in FIG. 2) of the comparator A1 when V1 is smaller than V2, while the output terminal is disconnected from the GND of the comparator A1 when V1 is larger than V2. Thus, if the output terminals of both the control circuit 7a and the control circuit 7b are not connected to the GND, the voltage of the pulse signal sent to the gate of the switching element 2c is about 8 V, whereas if the output terminal of any of the control circuit 7a and the control circuit 7b is connected to the GND, the voltage of the pulse signal sent to the gate of the switching element 2c is 0 V. Due to this, the voltage of the rectangular wave of a fixed frequency, which is formed in the comparator A2 and sent to the switching element 2c, is intermittently disabled or enabled to pass by the newly added comparator A1 (chopper control). Hereinafter, if the voltage of the rectangular wave sent to the gate of the switching element 2c is about 8 V, it is called a High voltage, and if the voltage of the rectangular wave becomes the GND potential, it is called a Low voltage. When the High voltage is sent, the switching element 2c is turned ON, whereas when the Low voltage is sent, the switching element 2c is turned OFF. The timing of switching ON-OFF of the switching element 2c is substantially equal to the timing of switching the High voltage and the Low voltage.

In FIG. 2, when the diode D1 of the control circuit 7c is not conductive, a voltage V3 determined by the resistor r3, resistor r4, capacitor C1, and power source VDD in the figure is input to the plus input terminal of the comparator A2 in the control circuit 7b, and the maximum value of V3 is a value obtained by dividing the voltage VDD by the resistors r3 and r4, which provides the maximum duty ratio.

The control circuit 7c functions to control the duty ratio based on the signal from the voltage detection circuit 5 during the DC lighting period of several tens msec since the lighting startup and the succeeding AC lighting period, so as to approach a target current value to be supplied to the discharge lamp 10, as in the conventional discharge lamp lighting device. To the other terminal of the resistor r8, the signal from the current detection resistor 4 is input via the I/F 7d (the voltage is V6), and also to the second input terminal of the microcomputer 7e, the signal from the current detection resistor 4 is input via the I/F 7d. Further, the signal from the voltage detection circuit 5 is input to the first input terminal of the microcomputer 7e via the I/F 7d. The microcomputer 7e determines a target value for the current to be supplied to the discharge lamp 10 in FIG. 5, and sends a signal corresponding to the target current value (voltage is V7) to the plus input terminal of the operational amplifier A3. The microcomputer 7e determines the amount of charge during the DC lighting period according to the signal from the current detection resistor 4. In the control circuit 7c, the output voltage V5 of the operational amplifier A3 is controlled by an inversion function so that V6 and V7 become equal. When the value of V5 is larger, the diode D1 is not conducted, and when the value of V5 becomes smaller, the diode D1 is conducted to draw out the charge of the capacitor C1, and lowers the plus input voltage V3 of the comparator A2, thereby reducing the duty ratio.

When the switch (not shown) of the DC power source 1 is turned ON, the control unit 7 starts to operate, pulse signals are sent from the output terminals of the control circuits 7a and 7b to the gate of the switching element 2c, and the switching element 2c repeats ON-OFF operation, by which the output voltage Va is boosted to the minus side. This principle is the same as the principle in which the output voltage Va of the booster circuit 2 in the conventional discharge lamp lighting device is boosted. Further, the switching elements 6a and 6d are turned ON under the control of the driver 8, as in the conventional lighting device.

Description is now made to the rectangular wave sent to the gate of the switching element 2c until the value of the output voltage Va of the booster circuit 2 just before the lighting startup becomes about −480 V, with Va being boosted. In the comparator A1 newly added in the discharge lamp lighting device of the first embodiment, the values of the resistors r1 and r2 were set so that the output terminal of the comparator A1 is connected to GND when the value of the voltage Va becomes smaller than −480 V, while the output terminal of the comparator A1 is disconnected from GND when the value of the voltage Va becomes larger than −480 V. Thus, after the switch of the DC power source 1 is turned ON and before the lighting of the discharge lamp 10 is started, a rectangular wave of a fixed duty ratio (maximum duty ratio) is sent to the switching element 2c as shown in FIG. 4B. Here, the diode D1 is not conductive before the lighting startup. Just before the discharge lamp 10 starts to light, the value of the voltage Va fluctuates at −480 V, and the operation is started for connecting the output terminal of the comparator A1, which has been disconnected from the GND up to now, or for breaking the connection, increasing thereby the number of times the Low voltage appears in the rectangular wave of a fixed duty ratio.

After that operation continues, if the voltage difference of the capacitor 9c reaches, for instance, about 400 V, as in the conventional discharge lamp lighting device, the discharge tube switch 9b is turned ON and a current flows through the primary winding of the transformer 9a to generate a high-voltage pulse of about 20 kV in the secondary winding, and the high-voltage pulse is applied to the discharge lamp 10 to cause breakdown between the electrodes of the discharge lamp 10, which then starts to light.

Figure 4A:
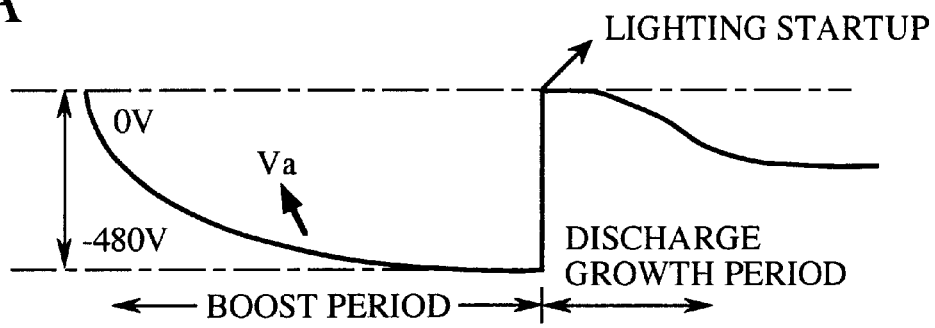
FIGS. 4A to 4C are explanatory views showing the output voltage of the booster circuit and the waveforms which are input to the gate of the switching element.
Figure 4B:
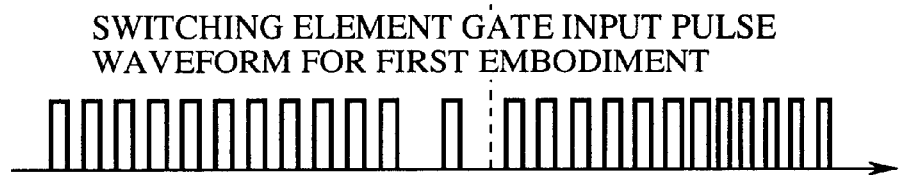
Figure 4C:
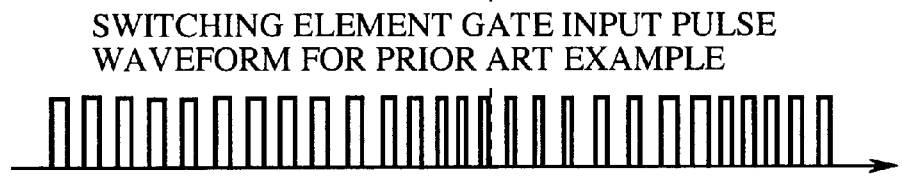

As shown in FIG. 4A, the output voltage Va of the booster circuit 2 rapidly increases from −480 V just after the lighting startup, and reaches about 0 V after about several tens $\mu$sec, entering the discharge growth period as in the case of the conventional discharge lamp lighting device. During this period, the output terminal of the comparator A1 is disconnected from GND, and a rectangular wave having a maximum duty ratio value before the lighting startup is sent to the gate of the switching element 2c. In this way, in the discharge lamp lighting device according to the first embodiment, the maximum duty ratio before the lighting startup can be continued as shown in FIG. 4B. The reason is described below.

In the comparator A2 in FIG. 2, in which the duty ratio is determined, the output voltage Va of the booster circuit 2 is not input to the plus input terminal of the comparator A2, though conventionally it is input through the voltage detection circuit 5 and the operational amplifier B1, and accordingly, there is no operation for feedback control of the duty ratio against the varying output voltage Va before and after the lighting startup, and a rectangular wave having a fixed maximum duty ratio determined by the resistors r3 and r4 can be sent to the gate of the switching element 2c just before and after the lighting startup. In the conventional discharge lamp lighting device, there is the operation for feedback control of the duty ratio against the varying output voltage before and after the lighting startup, and because of the response time of control, it is impossible to make the duty ratio, which has become smaller just before the lighting startup, larger just after the lighting startup.

Figure 17A:
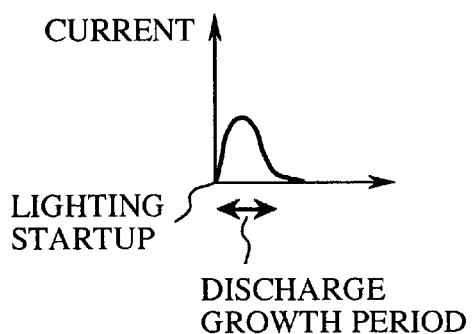
FIGS. 17A and 17B are waveform diagrams showing the waveforms of the current flowing through the discharge lamp immediately after the lighting startup.
Figure 17B:
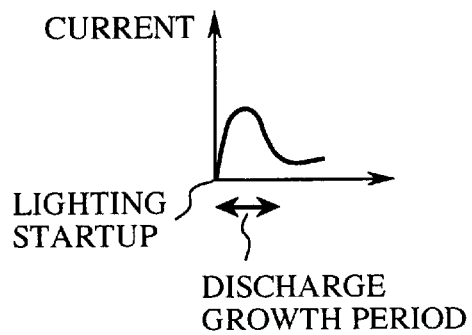

The smaller duty ratio value of the order of 10–50% just before and after the lighting startup in the conventional discharge lamp lighting device can be made a larger value of the order of 70–90% in the discharge lamp lighting device according to the first embodiment, and as a result, the current I3 flowing from the secondary winding 2b to the diode 2d just after the lighting startup can be made larger than the prior art. And, the minimum value Imin of the current flowing through the discharge lamp 10 can be made larger as shown in FIG. 17B, and the lighting failure of the discharge lamp 10 can be made difficult to be caused.

Figure 16:
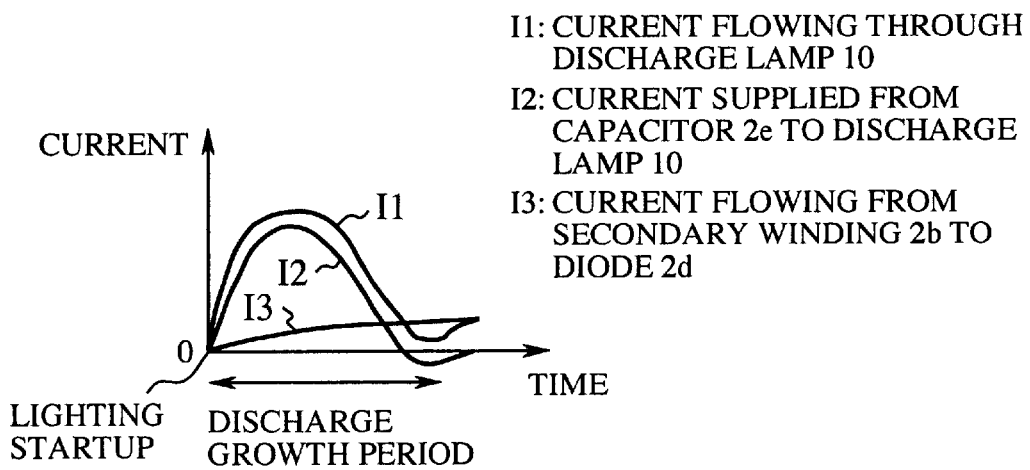
FIG. 16 is a diagrammatic illustration showing the waveforms of the currents flowing on the circuits of the discharge lamp lighting device.

In the discharge lamp lighting device according to the first embodiment, the maximum duty ratio just before and after the lighting startup was made around 80%, as described above. The reason for this is given below. FIG. 17A is a diagrammatic illustration of the waveform flowing through the discharge lamp 10 when the discharge lamp 10 is lighted for a sufficiently long time, powered off, and soon lighted again in the conventional discharge lamp lighting device, wherein after a large peak of the current waveform appears in the discharge growth period of several tens to several hundreds $\mu$sec from the discharge startup, the value of the current waveform becomes smaller and the minimum current value Imin appears, and at this instant, the lighting failure of the discharge lamp is likely to occur. As depicted in FIG. 16, in the current I1 flowing through the discharge lamp 10 during the discharge growth period just after the lighting startup of the conventional discharge lamp lighting device, the current I2 supplied from the capacitor 2e to the discharge lamp 10, and the current I3 flowing from the secondary winding 2b to the diode 2d, the magnitude of the current I2 is the same as that of the current I2 in the discharge lamp lighting device of the first embodiment. The reason for this is that the electrostatic energy charged into the capacitor 2e before the lighting startup is equal between the conventional discharge lamp lighting device and the discharge lamp lighting device according to the first embodiment. Accordingly, to increase the above value of Imin (FIG. 17B) to make the lighting failure of the discharge lamp 10 difficult to be caused, the value of the current I3 in the conventional discharge lamp lighting device is increased in the discharge lamp lighting device according to the first embodiment.

Figure 5:
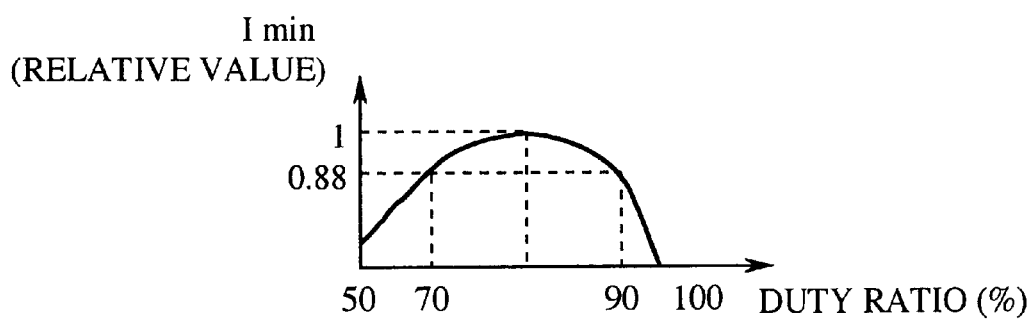
FIG. 5 is a characteristic diagram showing the relation between the minimum value of the current flowing through the discharge lamp and the maximum duty ratio.

In the discharge lamp lighting device according to the first embodiment, the relationship between the minimum current Imin flowing through the discharge lamp 10 and the maximum duty ratio is shown in FIG. 5. It is known from an experiment that the Imin value becomes larger when the maximum duty ratio is about 70–90%, and the value becomes smaller for other maximum duty ratio values. In the first embodiment, the values of the resistors r3 and r4, which determine the maximum duty ratio, are selected such that the maximum duty ration is about 80% at which the Imin value becomes maximum. In addition, as in the conventional discharge lamp lighting device, the Imin value for the case in which the discharge lamp 10 is lighted after powered-off period for a sufficiently long time is larger than the Imin value for the case in which it is powered off after the lighted period for a sufficiently long time, and soon lighted again, so that the lighting failure does not occur in the discharge lamp 10.

Figure 15:
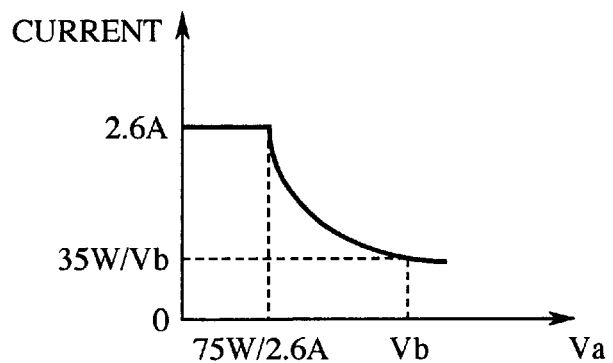
FIG. 15 is a characteristic diagram showing the current-voltage control pattern of the discharge lamp.

After the discharge growth period, transition is made to a stable steady lighting through the DC lighting period of several msec and the succeeding AC lighting period, just as in the case of the conventional discharge lamp lighting device. During the DC lighting period and AC lighting period, the driver 8 is controlled as in the conventional lighting device, and the output voltage 5V of the operational amplifier A3 is controlled such that the voltage Va between the electrodes of the discharge lamp 10 and the current pattern are given as previously determined, as shown in FIG. 15, whereby an optimum duty ratio is determined and the discharge lamp 10 is made to continue to light.

(Second Embodiment)

Figure 6:
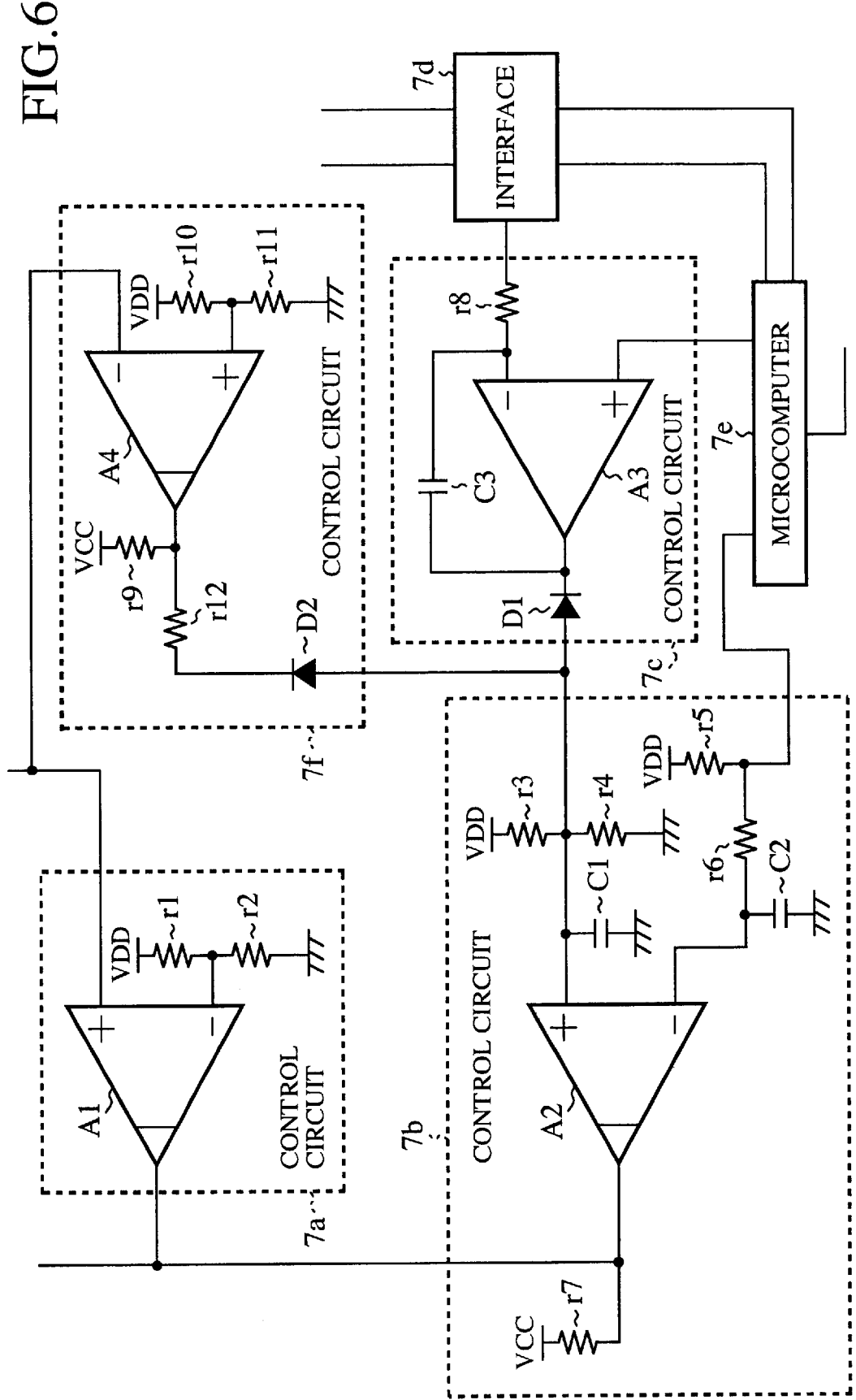
FIG. 6 is a circuit diagram showing the details of the control circuit according to a second embodiment of this invention.

FIG. 6 is a circuit diagram showing the details of the control circuit according to a second embodiment of this invention, and in the figure, 7f is a control circuit (third control circuit), and the control circuit 7f consists of a diode 2, a comparator A4, resistors r9 to r12, a power source VDD and a power source VCC.

The anode terminal of the diode D2 is connected to the input terminal of the control circuit 7b (the output terminal of the control circuit 7c), and the cathode terminal is connected to one terminal of the resistor r12. One terminal of the resistor r9 is connected to the other terminal of the resistor r12 and also to the output terminal of the comparator A4. The other terminal of the resistor r9 is connected to the power source VCC. The minus input terminal of the comparator A4 is connected to the plus input terminal of the comparator A1 in the control circuit 7a. The plus input terminal of the comparator A4 is connected to one terminal of the resistor r10 and one terminal of the resistor r11. The other terminal of the resistor r10 is connected to the power source VDD, and the other terminal of the resistor r11 is connected to GND.

The construction is the same as the first embodiment except for the control circuit 7f.

Now, the operation of the discharge lamp lighting device as configured above will now be described in details.

When the switch (not shown) of the DC power source 1 is turned ON, the control unit starts to operate, the output voltage Va of the booster circuit 2 is boosted to the minus side by repetition of ON-OFF of the switching element 2c, as in the first embodiment. The control of the driver 8 is the same as the first embodiment.

Before the lighting startup, a value obtained by dividing the output voltage Va by the voltage detection circuit 5 is also input to the minus input terminal of the comparator A4 as a voltage V9. The resistance values of the resistors r10 and r11 are selected such that the comparator A4 outputs the Low voltage when the value of the output voltage Va is larger than about −200 V, outputs the High voltage when the value of Va is smaller than about −200 V, and the comparator A4 is operated in the discharge lamp lighting device according to the second embodiment. Since the output voltage V8 of the comparator A4 is the High voltage just before the lighting startup, the diode D2 is not conductive, and does not function to control the duty ratio. Accordingly, the duty ratio control just before the lighting startup is similar to the first embodiment.

The value of Va just after the lighting startup rapidly increases from −480 V to 0 V, as in the first embodiment, and the voltage V9 of the minus input terminal of the comparator A4 also rises to nearly the voltage of the power source VDD. In this case, the output voltage V8 is made to be the Low voltage by the function of the comparator A4 about several tens $\mu$sec after the discharge lamp 10 has started to light, and the diode D2 is made conductive, so as to decrease the duty ratio.

In the above first embodiment, the duty ratio just before and after the lighting startup is fixed to about 80%, and the output current of the booster circuit 2 just after the lighting startup can be increased more than the case of the prior art, thereby to eliminate the lighting failure of discharge. The objective of this second embodiment is to further increase reliability by increasing the output current of the booster circuit 2 more than the case of the first embodiment.

Figure 7:
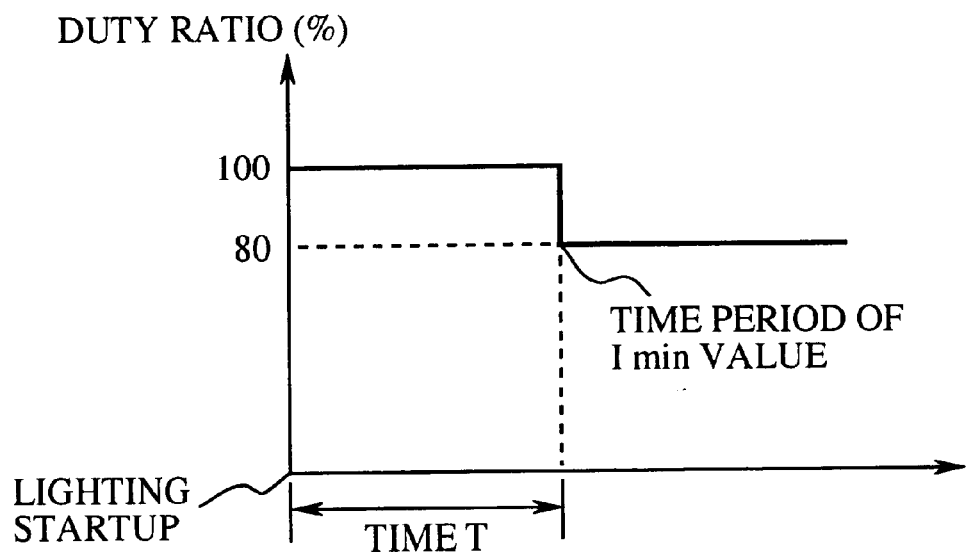
FIG. 7 is a characteristic diagram showing the change of the duty ratio in simulation.

Accordingly, a control is made in simulation in which the duty ratio of about 80% just before and after the lighting startup is made 100%, and it is decreased to about 80% during a time period of the Imin value within the discharge growth period, thereby to observe how the output current of the booster circuit 2 rises up. First, a conceptual view of the duty ratio change in the simulation is shown in FIG. 7. Described below is the reason for making the duty ratio 100% just before and after the lighting startup, and decreasing it to about 80% during the time period of the Imin value within the discharge growth period.

Figure 8:
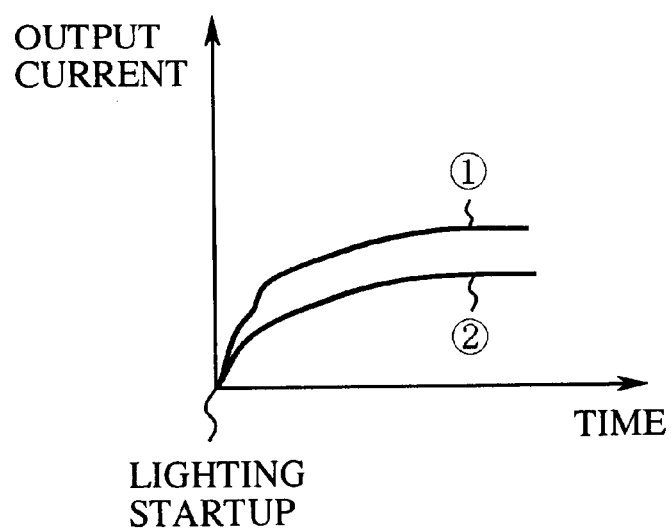
FIG. 8 is a diagrammatic view showing the output current waveforms in simulation.

By making the duty ratio 100% just before and after the lighting startup, electromagnetic energy is accumulated in the primary winding 2a of the booster circuit 2 as much as possible. Thereafter, during the time period of the Imin value within the discharge growth period, the duty ratio is reduced to about 80%, which is the same as the first embodiment. More electromagnetic energy than the first embodiment is accumulated in the primary winding 2a during the period of the duty ratio of 100%, and the booster circuit 2 releases that large energy to the discharge lamp 10 during the period of the duty ratio of 80%. As a result, the Imin value becomes larger than the first embodiment, and the lighting failure of the discharge lamp 10 is made difficult to be caused. And, as shown in the diagrammatic illustration in FIG. 8, the current flowing through the diode 2d (curve ①) in the case where the duty ratio is decreased from 100% to 80% after the lighting startup is observed to have a current value larger than the case in which the duty ratio is fixed to 80% (curve ②) as a result also in the simulation. Therefore, the output current of the booster circuit 2 is also larger when the duty ratio is decreased from 100% to 80% after the lighting startup. As the simulation technique, using this time as the simulation circuit a circuit having the booster circuit 2, and parameters the switching element 2c and the DC power source of the discharge lamp lighting device for operating the booster circuit 2, the relation between the output current of the booster circuit 2 and the duty ratio of the pulse waveform applied to the gate of the switching element 2c was examined.

In the second embodiment, reflecting the result of the above simulation, the circuit is constructed such that the maximum duty ratio just before and after the lighting startup is made to be a larger value of about 90%, nearly 100%, and the duty ratio is decreased to about 80% described above in the time period in which the Imin value appears. The output of the comparator A4 in FIG. 6 is the High voltage just before and after the lighting startup, as described above, and there is no function of controlling the duty ratio. Accordingly, the resistors r3 and r4 for determining the maximum duty ratio of about 90% just before and after the lighting startup can first be selected.

After about several tens μsec since the lighting startup, the output of the comparator A4 becomes the Low voltage, and the comparator A4 operates to lower the duty ratio. At this point, the duty ratio is determined by the voltage V3 (the plus input voltage of the comparator A2) determined by the voltage drop in the resistors r3 and r4, the capacity C1, the resistor r12, and the diode D2. By this voltage V3, the resistor r12 in FIG. 6 is selected in such a manner that the duty ratio can be made a value of about 80% during the time period in which the Imin value appears.

Figure 9:
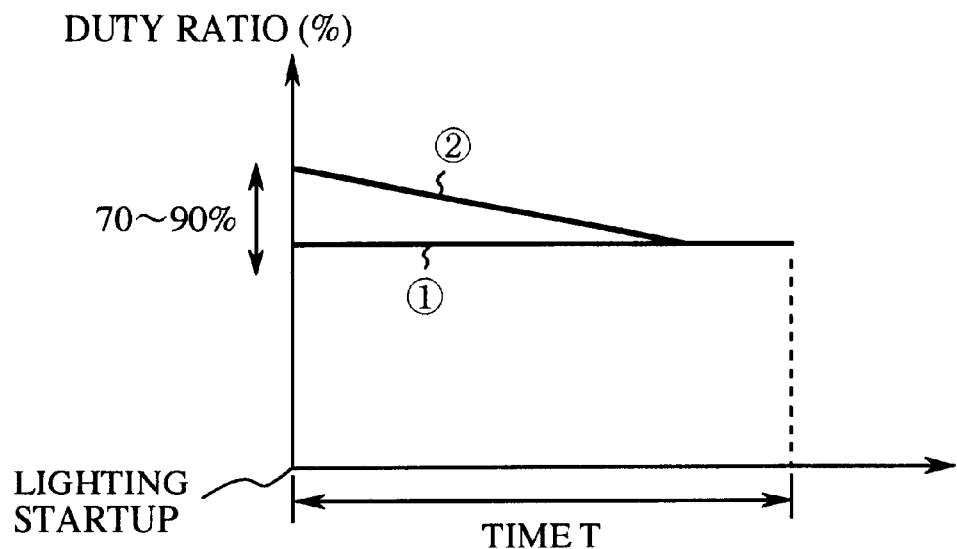
FIG. 9 is a characteristic diagram showing the charge in the duty ratio according to the first and second embodiments of this invention.

The change in the duty ratio of the second embodiment is shown in FIG. 9. A period of time T from the lighting startup corresponds to the discharge growth period of several tens to a hundred μsec. The curve ② represents the change in the duty ratio in the second embodiment, and the curve ① represents the change in the duty ratio in the first embodiment. On the curve of ②, just after the lighting startup the duty ratio becomes about 90%, and the voltage V3 decreases with the time constant determined by the resistors r3 and r4, the capacitor C1 and the resistor r12, as described above, and the duty ratio also decreases accordingly. When a predetermined voltage value determined by the voltage drop in the resistors r3, r4 and r12 and the diode D2 is reached, the duty ratio becomes about 80%. By the duty ratio control as described above, in the second embodiment, the output current of the booster circuit 2 increases more than the case of the first embodiment during the time period in which the Imin value appears, and the current supplied to the discharge lamp 10 increases more than the case of the first embodiment, thereby increasing the reliability. After the discharge growth period, the switching element 2c and the driver 8 are controlled as in the first embodiment, and the discharge lamp 10 is put in the stable steady lighting state. Although the comparator A4 has been newly added in this second embodiment, it is to be understood that a similar control can be carried out by using an operational amplifier instead of the comparator A4.

(Third Embodiment)

Figure 10:
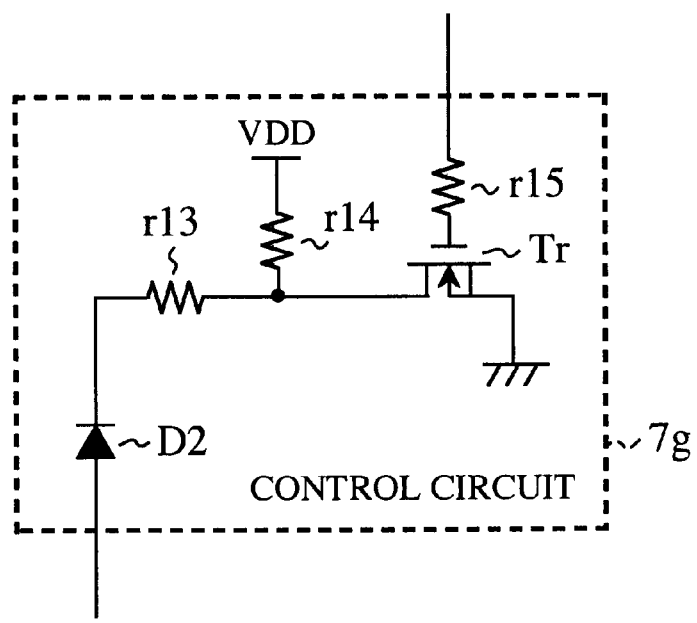
FIG. 10 is a circuit diagram showing the details of the control circuit according to a third embodiment of this invention.

FIG. 10 is a circuit diagram showing the details of the control circuit according to a third embodiment of this invention, and in the figure, 7g is a control circuit (third control circuit), which consists of a diode D2, a switching element Tr, resistors r13 to r15, and a power source VDD.

One terminal of each of the resistors r13 and r14 is connected to the drain terminal of the switching element Tr, and the other terminal of the resistor r14 is connected to the power source VDD. The other terminal of the resistor r13 is connected to the cathode terminal of the diode D2. The anode terminal of the diode D2 is connected to the input terminal of the control circuit 7b (the output terminal of the control circuit 7c), as in the case of the second embodiment. The source terminal of the switching element Tr is connected to GND, and the gate terminal is connected to one terminal of the resistor r15. The other terminal of the resistor r15 is connected to the plus input terminal of the comparator A1 in the control circuit 7a.

The construction is the same as the first embodiment except for the control circuit 7g.

Now, the operation of the discharge lamp lighting device as configured above will now be described below.

By using a switching element instead of the comparator A4 described in the above second embodiment, the duty ratio can also be made about 90% just before and after the lighting startup and decreased to about 80% during the time period in which the Imin value appears. In the third embodiment, the circuit construction as shown in FIG. 10 is provided instead of the control circuit 7f using a comparator described in the above second embodiment.

As the switch (not shown) of the DC power source 1 is turned ON and the output voltage Va of the booster circuit 2 is boosted to the minus side, the voltage divided by the voltage detection circuit 5 is becoming smaller and approaching zero, and a voltage of nearly 0 V is sent to the gate of the switching element Tr via the resistor r15. At this point, the switching element Tr is turned OFF, a high voltage (the High voltage) determined by the resistors r13 and r14 is applied to the cathode of the diode D2, and the diode D2 is not conducted, as in the second embodiment, hence providing no duty ratio control. Accordingly, the duty ratio control just before the lighting startup is similar to the second embodiment.

Just after the lighting startup, the value of the output voltage Va rapidly rises from −480 V to 0 V, as in the second embodiment, the voltage divided by the voltage detection circuit 5 becomes larger, and a high voltage of nearly 5 V is sent to the gate of the switching element Tr through the resistor r15. At this point, the switching element Tr is turned ON, 0 V of the GND voltage is applied to one terminal of the resistor r13, and the diode D2 is conducted, controlling the duty ratio to be lowered. The resistor r13 is selected in a manner similar to the second embodiment such that, after the lighting startup, the duty ratio value can be made about 80% during the time period in which the Imin value appears. And, the output current of the booster circuit 2 increases more than the above first embodiment during the time period in which the Imin value appears, and the current supplied to the discharge lamp 10 increases more than the above first embodiment, thereby to increase the reliability.

(Fourth Embodiment)

Figure 11:
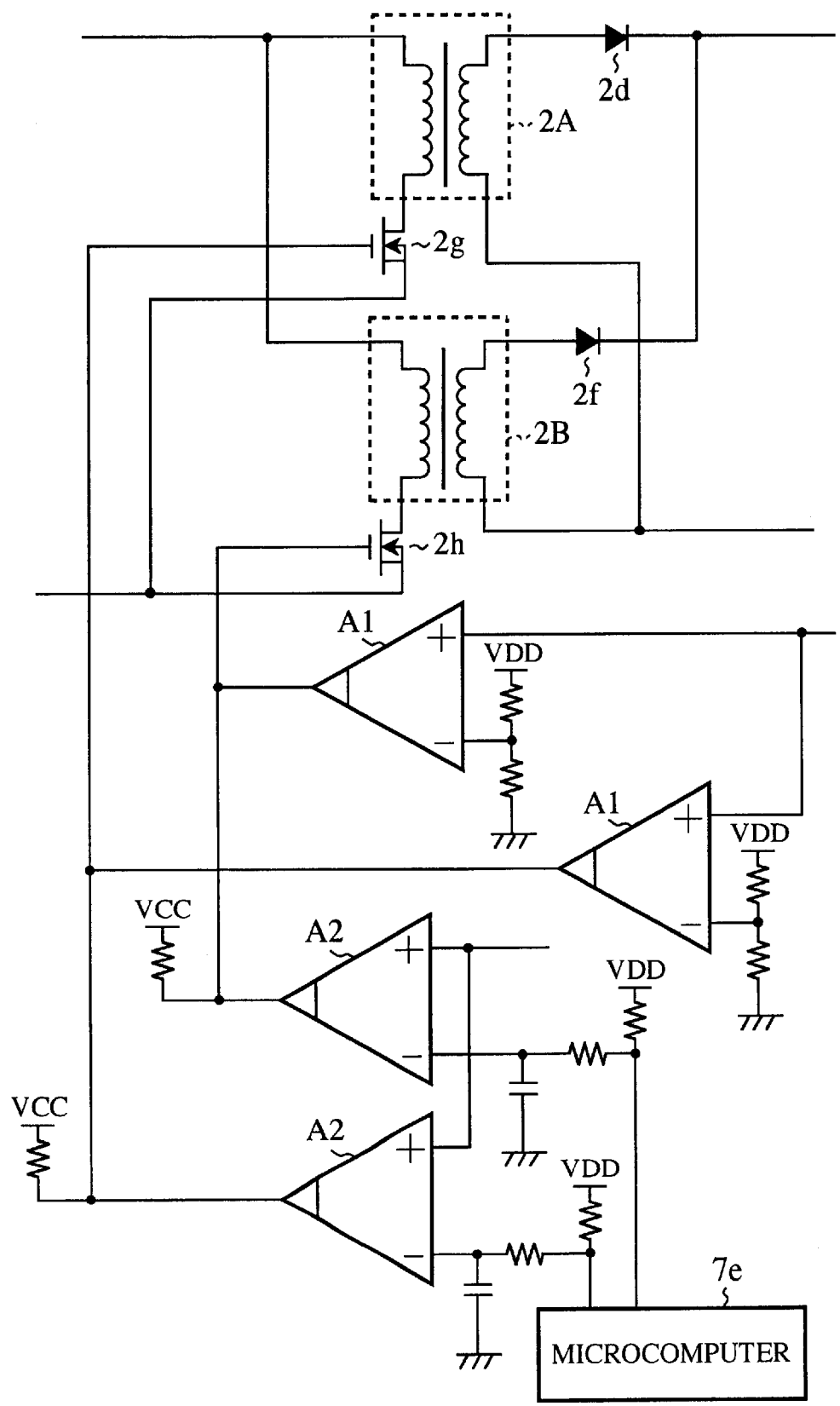
FIG. 11 is a circuit diagram showing one part of the discharge lamp lighting device according to a fourth embodiment of this invention.

FIG. 11 is a circuit diagram showing a part of the discharge lamp lighting device according to a fourth embodiment of this invention, and in the figure, two of the comparator A1 described in the above first to third embodiments are used, and the respective outputs are connected to the gates of the switching elements 2g and 2h. Further, two of the comparator A2 are also used, the respective outputs of which are connected to the gates of the switching elements 2g and 2h. The drain terminals of the switching elements 2g and 2h are connected to the input sides of the transformers 2A and 2B, respectively. The source terminals of the switching elements 2g and 2h are connected to each other. The anode terminals of the diodes 2d and 2f are connected to the output sides of the transformers 2A and 2B, respectively. The cathode terminals of the diodes 2d and 2f are connected to each other. The connection of resistors to the plus and minus input terminals of each compactor A1 is made in a manner similar to the above first to third embodiments. The plus input terminals of the respective comparators A1 are connected to each other. The connection of resistors and a capacitor to the minus input terminal of each comparator A2 is also made in a manner similar to the first to third embodiments. Further, the capacitor, resistors, and diode which are connected to the plus input terminal of the comparator A2 are also similar to the first to third embodiments. In addition, the plus input terminals of the respective comparators A2 are connected to each other. Structurally similar to the first to third embodiments are the capacitor 2e, the earth line 3, the current detection resistor 4, the voltage detection circuit 5, the resistors 5a to 5d in the voltage detection circuit 5, the inverter circuit 6, the switching elements 6a to 6d in the inverter circuit 6, the driver 8, the startup discharge circuit 9, the transformer 9a and the discharge tube switch 9b and the capacitor 9c in the startup discharge circuit 9, and the discharge lamp 10.

Now, the operation of the discharge lamp lighting device as configured above will now be described below.

In the booster circuit 2 described in the above first to third embodiments, the use of a plurality of transformers formed of the primary winding 2a and the secondary winding 2b may also enable the control of the duty ratio before and after the lighting startup described in the above first to third embodiments. If a plurality of transformers are used, a plurality of switching elements 2c and diodes 2d are also used. The use of a plurality of elements can reduce the load per element, and the dielectric strength and the heat resistance can be increased.

Shown in FIG. 11 is the circuit construction in which two transformers, switching elements, and diodes are used, respectively.

Figure 12:
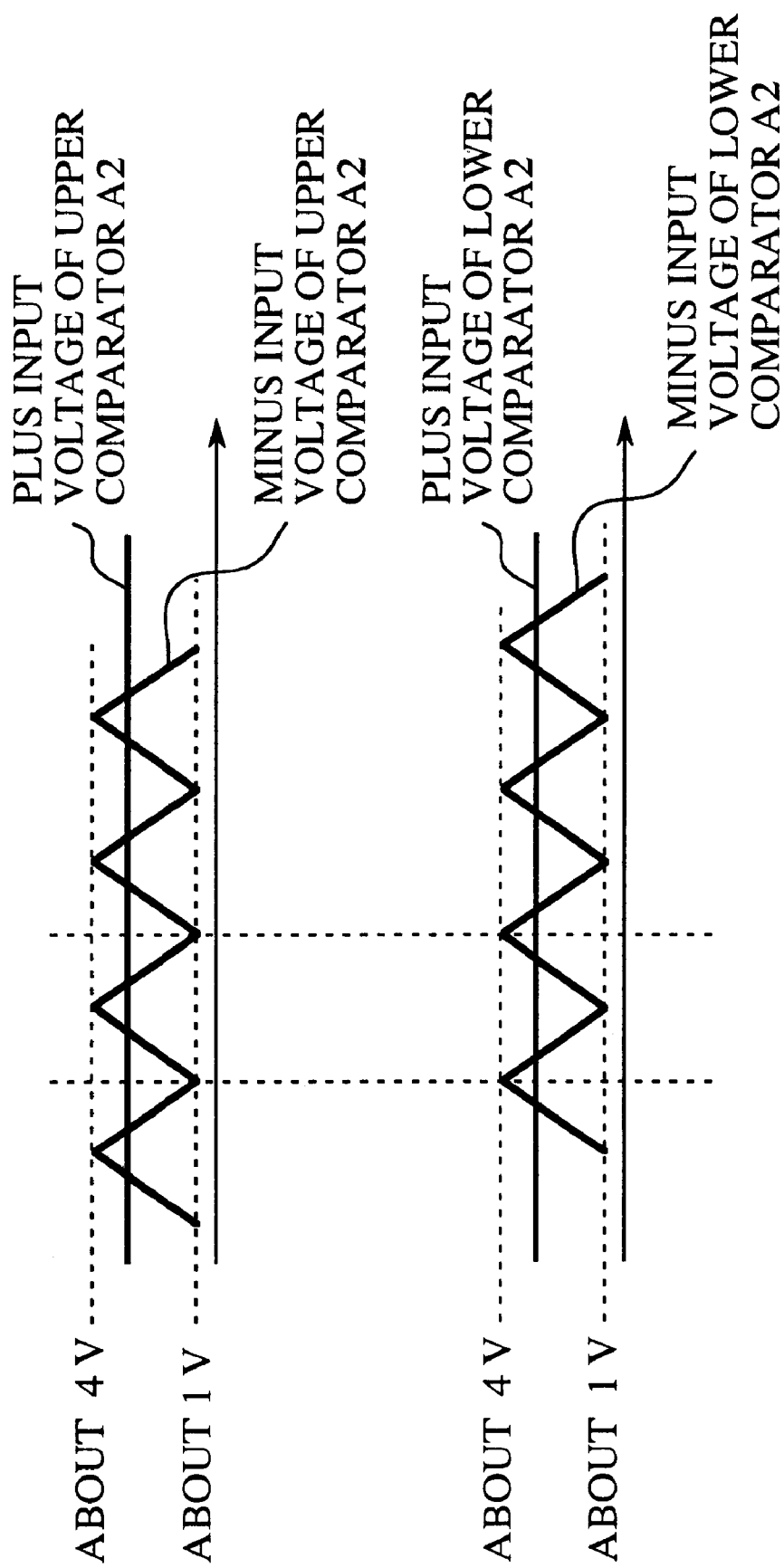
FIG. 12 is a waveform diagram showing the substantially triangular waves which are input to the comparator according to the fourth embodiment of this invention.
Figure 13:
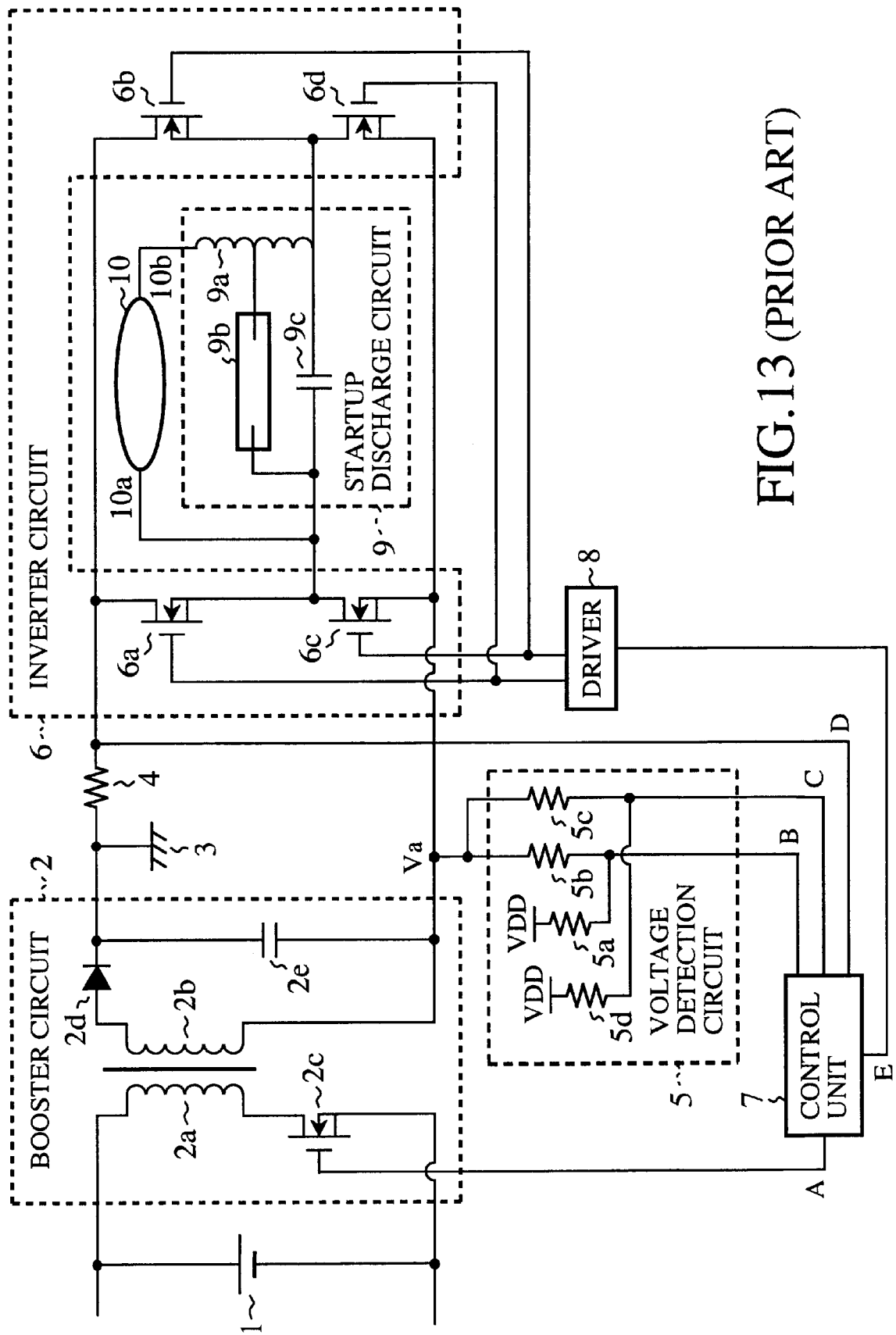
FIG. 13 is a circuit diagram showing the conventional discharge lamp lighting device.
Figure 14:
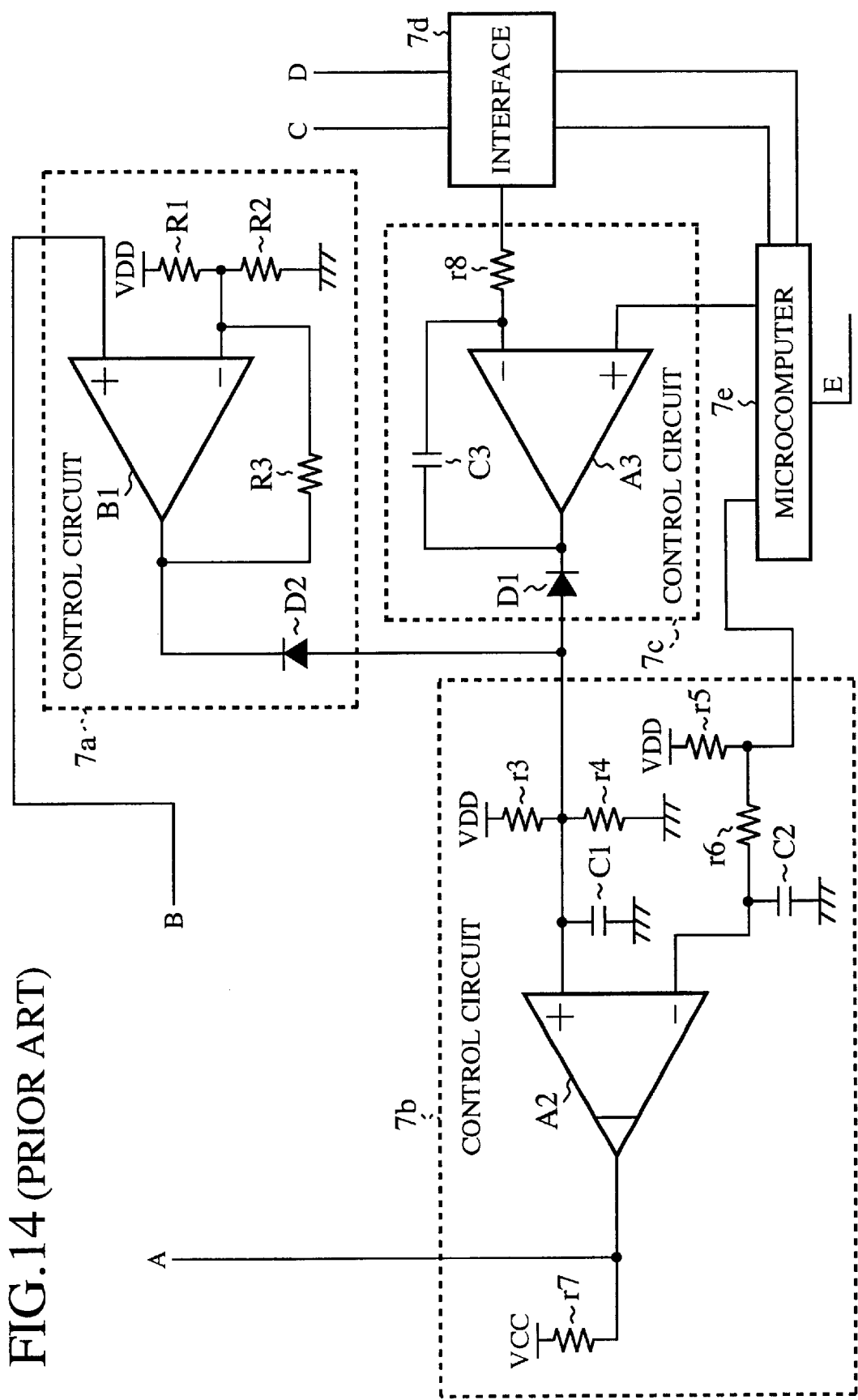
FIG. 14 is a circuit diagram showing the details of the conventional discharge lamp lighting device.

When the switch of the DC power source 1 is turned ON, the control circuit 7 starts to operate, and by repetition of ON-OFF of the switching elements 2g and 2h as in the first to third embodiments, the output voltage Va of the booster circuit 2 is boosted to the minus side. In this fourth embodiment, the triangular waves input to the minus terminals of the respective comparators A2 in FIG. 11 are input in such a manner that they are out of phase with each other, as shown in FIG. 12. Accordingly, the switching elements 2g and 2h are opposite in timing for ON-OFF. In addition, the duty ratio control before and after the lighting startup and the circuit operation are similar to the above first to third embodiments.

As described above, the discharge lamp lighting device is constructed such that it comprises a first control circuit for outputting a pulse modulated by pulse width modulation to the switching element of a booster circuit, and a second control circuit for controlling the pulse output from the first control circuit to the switching element in such a manner as to intermittently enable or disable the passage thereof, in order that the DC voltage detected by a voltage detection circuit becomes a predetermined voltage. Due to this, a predetermined voltage required for the startup discharge of a discharge lamp can be supplied from the booster circuit to the startup discharge circuit by controlling the pulse output from the first control circuit to the switching element in such a manner as to intermittently enable or disable the passage thereof. Further, in the very short period of several tens to several hundreds μsec just after the lighting startup of the discharge lamp, the pulse modulated by a predetermined pulse width modulation is output from the first control circuit to the switching element without controlling the pulse output from the first control circuit to the switching element by the second control circuit to disable the passage thereof, and thus, the ON operation time of the switching element in the above period can be controlled to be longer as compared with the prior art, and the current supplied from the booster circuit to the discharge lamp increases, thereby providing such an advantage that the lighting failure of the discharge lamp in the discharge growth period can be eliminated.

The discharge lamp lighting device according to the present invention is constructed such that in the first control circuit, a pulse width modulation is conducted in such a manner as to hold the duty ratio of the pulse output just before and after the lighting startup of the discharge lamp is held to a larger value. Due to this, during the very short period of several tens to several hundreds μsec just after the lighting startup of the discharge lamp, the ON operation time of the switching element during the above period can be controlled to be longer as compared with the prior art, and the current supplied from the booster circuit to the discharge lamp increases, resulting in such an advantage that the lighting failure of the discharge lamp during the discharge growth period can be eliminated.

the discharge lamp lighting device is constructed such that it comprises a third control circuit for determining the lighting startup of the discharge lamp according to the DC voltage detected by the voltage detection circuit, and controlling the pulse width modulation of the first control circuit so as to change the duty ratio of the output pulse from the larger value to a smaller value during the period of about several tens to several hundreds μsec after the lighting startup of the discharge lamp. Due to this, as compared with the prior art, a change is made with an optimum duty ratio during the period of about several tens to several hundreds μsec after the lighting startup of the discharge lamp, and the ON operation time of the switching element in the above period is controlled to be longer to increase the current supplied from the booster circuit to the discharge lamp, resulting in such an advantage that the lighting failure of the discharge lamp during the discharge growth period can be eliminated and the reliability can also be increased.

What is claimed is:

1. A discharge lamp lighting device comprising:
    a booster circuit, whose input side is connected to a DC power source, and having a switching element therein for boosting the voltage of the DC power source in response to the ON-OFF operation of the switching element;
    a startup discharge circuit for performing the startup discharge of the discharge lamp according to the DC voltage boosted by said booster circuit;
    a voltage detection circuit for detecting the DC voltage boosted by said booster circuit;
    a first control circuit for outputting the pulse modulated by pulse width modulation to said switching element; and
    a second control circuit for intermittently enabling or disabling the passage of the output pulse from said first control circuit to said switching element so that the DC voltage detected by said voltage detection circuit becomes a predetermined voltage.

2. A discharge lamp lighting device according to claim 1, wherein the first control circuit performs the pulse width modulation so as to hold the duty ratio of the output pulse just before and after the lighting startup of the discharge lamp to be a larger value.

3. A discharge lamp lighting device according to claim 1, further comprising a third control circuit for determining the lighting startup of the discharge lamp according to the DC voltage detected by the voltage detection circuit, and controlling the pulse width modulation of the first control circuit to change the duty ratio of the output pulse from the larger value to a smaller value during the period of about several tens to several hundreds μsec after the lighting startup of the discharge lamp.

* * * * *